United States Patent
Zhang

(10) Patent No.: US 10,936,144 B2
(45) Date of Patent: *Mar. 2, 2021

(54) METHOD AND APPARATUS FOR DISPLAYING INFORMATION

(71) Applicant: Advanced New Technologies Co., LTD, Grand Cayman (KY)

(72) Inventor: Min Zhang, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/784,148

(22) Filed: Feb. 6, 2020

(65) Prior Publication Data

US 2020/0174628 A1   Jun. 4, 2020

Related U.S. Application Data

(63) Continuation of application No. 14/969,244, filed on Dec. 15, 2015, now Pat. No. 10,572,096.

(30) Foreign Application Priority Data

Dec. 16, 2014 (CN) .......................... 201410785058.1

(51) Int. Cl.
*G06F 3/044* (2006.01)
*G06F 1/32* (2019.01)
(Continued)

(52) U.S. Cl.
CPC .............. *G06F 3/0481* (2013.01); *G09G 5/14* (2013.01); *G06F 2203/04801* (2013.01);
(Continued)

(58) Field of Classification Search
CPC .............. G06T 19/006; G06K 9/00677; G06K 7/1417; G06F 2203/04804
See application file for complete search history.

(56) References Cited

U.S. PATENT DOCUMENTS

| | | |
|---|---|---|
| 4,555,775 A | 11/1985 | Pike |
| 4,622,545 A | 11/1986 | Atkinson |

(Continued)

FOREIGN PATENT DOCUMENTS

| | | |
|---|---|---|
| CN | 102025829 A | 4/2011 |
| WO | WO 2016/100280 A1 | 6/2016 |

OTHER PUBLICATIONS

PCT International Search Report and Written Opinion dated Mar. 3, 2016, issued in corresponding International Application No. PCT/US2015/65715 (13 pages).

(Continued)

*Primary Examiner* — Jordany Nunez
(74) *Attorney, Agent, or Firm* — Finnegan, Henderson, Farabow, Garrett & Dunner, LLP

(57) ABSTRACT

A terminal device for securely displaying information is provided. The terminal device includes a monitoring module configured to monitor a display position of a Digital Object Unique Identifier (DOI) and a display position of other information on a page displayed on the terminal device, and a processing module configured to hide at least a portion of the other information that overlaps the DOI to expose the DOI when it is detected that the display position of the other information overlaps the display position of the DOI.

17 Claims, 5 Drawing Sheets

(51) Int. Cl.
   *G06F 15/00* (2006.01)
   *G06F 3/0481* (2013.01)
   *G09G 5/14* (2006.01)
   *G06T 11/60* (2006.01)

(52) U.S. Cl.
   CPC .... *G06F 2203/04804* (2013.01); *G06T 11/60* (2013.01); *G09G 2340/10* (2013.01); *G09G 2340/14* (2013.01)

(56) References Cited

U.S. PATENT DOCUMENTS

| | | | |
|---|---|---|---|
| 4,939,507 | A | 7/1990 | Beard et al. |
| 5,062,060 | A | 10/1991 | Kolnick |
| 5,155,806 | A | 10/1992 | Hoeber et al. |
| 5,222,203 | A | 6/1993 | Obata |
| 5,265,202 | A | 11/1993 | Krueger et al. |
| 5,283,560 | A | 2/1994 | Bartlett |
| 5,479,603 | A | 12/1995 | Stone et al. |
| 7,624,337 | B2 | 11/2009 | Sull et al. |
| 7,627,419 | B2 | 12/2009 | Yoshida |
| 7,880,726 | B2 | 2/2011 | Nakadaira et al. |
| 8,169,916 | B1 | 5/2012 | Pai et al. |
| 8,634,871 | B2 | 1/2014 | Mitsunaga |
| 9,019,304 | B2 | 4/2015 | Takeichi et al. |
| 9,383,867 | B2 * | 7/2016 | Hirakawa .............. G06F 3/044 |
| 2002/0171682 | A1 | 11/2002 | Frank et al. |
| 2006/0070066 | A1 | 3/2006 | Grobman |
| 2007/0035775 | A1 | 2/2007 | Asai |
| 2007/0067089 | A1 | 3/2007 | Yoshida |
| 2008/0225007 | A1 | 9/2008 | Nakadaira et al. |
| 2008/0313648 | A1 | 12/2008 | Wang et al. |
| 2009/0138811 | A1 * | 5/2009 | Horiuchi ............. G06F 3/04842 715/768 |
| 2009/0213141 | A1 | 8/2009 | Gao |
| 2010/0281537 | A1 | 11/2010 | Wang et al. |
| 2010/0299630 | A1 | 11/2010 | McCutchen et al. |
| 2011/0285874 | A1 | 11/2011 | Showering et al. |
| 2013/0012264 | A1 | 1/2013 | Mtsunaga |
| 2013/0031511 | A1 | 1/2013 | Adachi |
| 2013/0088516 | A1 | 4/2013 | Ota et al. |
| 2013/0148914 | A1 | 6/2013 | Blasczak et al. |
| 2014/0092121 | A1 | 4/2014 | Robinson |
| 2014/0098131 | A1 | 4/2014 | Fein et al. |
| 2015/0012426 | A1 | 1/2015 | Purves et al. |
| 2015/0206349 | A1 | 7/2015 | Rosenthal et al. |
| 2016/0078522 | A1 | 3/2016 | Sakazume |
| 2017/0039867 | A1 | 2/2017 | Fieldman |

OTHER PUBLICATIONS

First Chinese Office Action issued in Chinese Application No. CN201410785058.1, dated Sep. 30, 2017, 13 pages.
First Chinese Search Report issued in Chinese Application No. CN201410785058.1, dated Sep. 19, 2017 (1 page).
Supplemental Chinese Search Report issued in Chinese Application No. CN201410785058.1, dated Jun. 13, 2018 (1 page).
Third Chinese Office Action issued in Chinese Application No. CN201410785058.1, dated Jun. 25, 2018, 16 pages.

\* cited by examiner

METHOD AND APPARATUS FOR DISPLAYING INFORMATION

CROSS-REFERENCE TO RELATED APPLICATION

This application is a continuation of Ser. No. 14/969,244, filed Dec. 15, 2015, which claims priority to and the benefits of priority to Chinese Patent Application No. 201410785058.1, filed Dec. 16, 2014. The contents of the aforementioned applications are incorporated herein by reference in their entireties.

TECHNICAL FIELD

The present application relates to the field of computer technologies, and in particular, to a method and an apparatus for displaying information.

BACKGROUND

With the development of information technologies, Digital Object Unique Identifiers (DOIs), such as barcodes, originated from a digital resource identification technology, are widely applied. A DOI is a code pattern formed by specific geometric figures (such as rectangles and squares). DOIs may include: one-dimensional barcode, two-dimensional barcode (also referred to as two-dimensional code), and the like. The DOI presents, in a graphic form, various encoded "intangible" information such as Internet link information, product information, or text information. A user can use a device to scan and identify the DOI, thereby acquiring information contained in the DOI.

A website provider can provide users with DOI-form information on a web site. For example, a DOI can be displayed on a page of a website, and after a user uses a device having a camera function (for example, a smartphone, a tablet computer, or other terminal devices) to scan the DOI, the device can read information in the DOI. For example, Internet link information may be embedded in a two-dimensional code and a user may use a device to read the link information in the two-dimensional code.

In the mechanism described above, a user generally needs two devices to perform the function. Specifically, one device is used to display a website page containing the DOI, and the other device is used to scan the displayed DOI. In the device for displaying the DOI, a cursor or another window on the page may obscure an area where the DOI is displayed, and when the DOI is obscured, the process of scanning the DOI will be affected, or even worse, the scanning device may fail to read the DOI.

SUMMARY

The present disclosure provides a terminal device for displaying information. Consistent with some embodiments, the terminal device includes a monitoring module configured to monitor a display position of a Digital Object Unique Identifier (DOI) and a display position of other information on a page displayed on the terminal device, and a processing module configured to hide at least a portion of the other information that overlaps the DOI to expose the DOI when the processing module detects that the display position of the other information overlaps the display position of the DOI.

The present disclosure also provides a method for displaying information on a terminal device. Consistent with some embodiments, the method for displaying information on a terminal device may include monitoring a display position of a DOI and a display position of other information on a page displayed on the terminal device, and when it is detected that the display position of the other information overlaps the display position of the DOI, hiding at least a portion of the other information that overlaps the DOI to expose the DOI.

Consistent with some other embodiments of the present disclosure, a method for displaying information on a terminal device may include detecting coordinates of a display position of a DOI and coordinates of a display position of other information on a page displayed on the terminal device, determining whether any of the coordinates of the display position of the DOI superimpose on the coordinates of the display position of the other information, and hiding at least a portion of the other information that superimposes on the DOI to expose the DOI when it is determined that at least some of the coordinates of the display position of the DOI superimpose on the coordinates of the display position of the other information.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated herein and constitute a part of this specification, illustrate embodiments consistent with the present disclosure and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatus and methods consistent with aspects related to the invention as recited in the appended claims.

Figure 1:
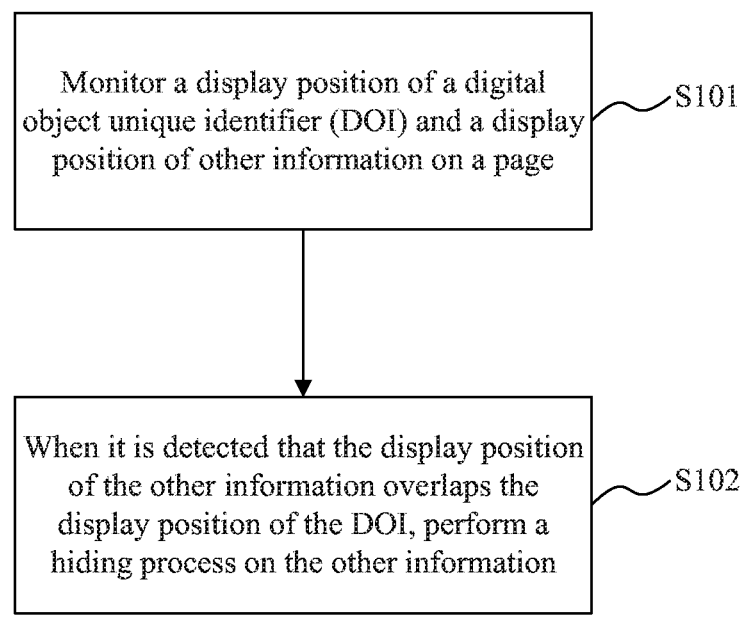
FIG. 1 shows a flow chart of an information display process according to an embodiment of the present application.

The present disclosure provides a method for displaying information on a webpage. FIG. 1 shows one embodiment of an information display process of the present disclosure. As shown in FIG. 1, the process may include the following steps.

S101: monitor a display position of a DOI and a display position of other information on a page.

In some embodiments of the present application, the DOI may include, but is not limited to: graphic identifiers such as a barcode or a two-dimensional code. The page may be one of various interfaces that contain the DOI, for example, a website page, an application page, or a floating window. The page may be displayed by a terminal device having a display function, for example, a computer, a tablet computer, or a smartphone.

In one embodiment, the other information described above may be an image, text, or other objects that may obscure the DOI. For example, the other information may be a cursor. The cursor may have various graphic structures for indicating a control position, for example, a mouse pointer. The page may include various display information, and the display information may be displayed on the page in a popup or hover manner, for example, a popup window, a hover picture, or a hover Flash animation. The other information may include, but is not limited to, at least one of a cursor, a popup window, and a floating window.

In actual applications, when a user uses a terminal device to open a page, a DOI and other information on the page may be embedded in the page or hover on the page. In some manner, the terminal device displays the DOI and other information only when the DOI and other information appear in a display window (for example, a browser window or a terminal screen) of the terminal device. The display position of the DOI and the display position of the other information in the present application refer to positions where the DOI and other information are displayed when they appear in the display window.

When the other information described above is displayed on the page, the other information may obscure or even completely cover the DOI. That is, the display position of the other information overlaps the display position of the DOI. Consequently, the DOI cannot be clearly displayed on the page. In this scenario, the terminal device for reading the DOI cannot read the information in the DOI.

Figure 2:
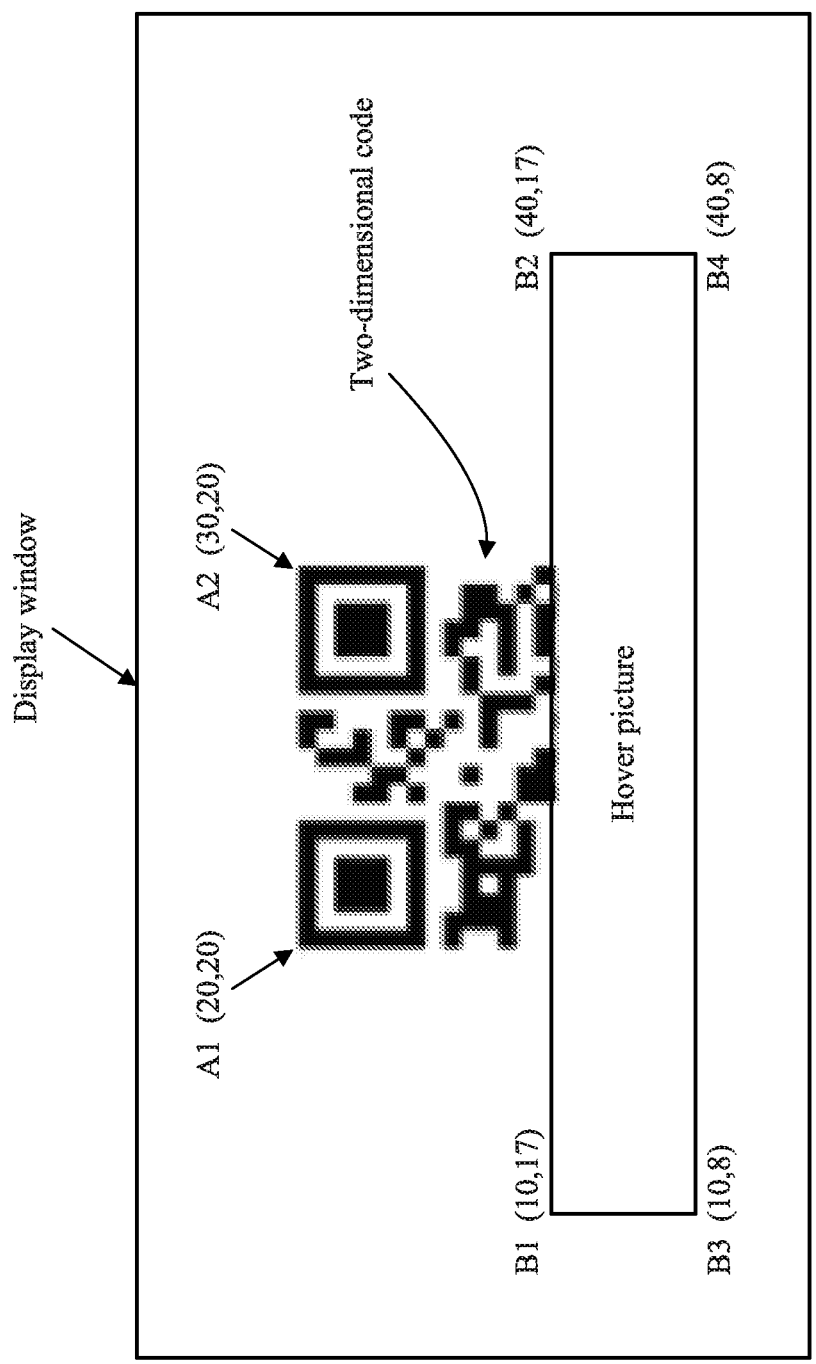
FIG. 2 shows a schematic diagram in which a hover picture obscures a two-dimensional code on a page according to an embodiment of the present application.

For example, as shown in FIG. 2, the page is displayed in a display window of the terminal device. On the page, the DOI is a two-dimensional code, and the other information is a hover picture. The hover picture is currently suspended above the two-dimensional code, and obscures a part of the two-dimensional code. As a result, other terminal devices cannot read information in the two-dimensional code.

Therefore, in one embodiment of the present application, the terminal device, which displays the DOI, can monitor the display position of the DOI and the display position of the other information on the page, and detect whether the display position of the DOI overlaps the display position of the other information. In some embodiments, the display position of the DOI and the other information can be represented by coordinates. The terminal device, which displays the page, can detect whether the coordinates of the DOI superimpose on the coordinates of the other information (for example, whether they have the same X-Y coordinates).

S102: when it is detected that the display position of the other information overlaps the display position of the DOI, the terminal device performs a hiding process on the other information.

Consistent with some embodiments, when the terminal device detects that coordinate sets of the display position of the DOI and the other information superimpose with each other, it can be assumed that the display position of the other information overlaps the display position of the DOI. To ensure that the DOI can be clearly displayed on the page, the terminal device can perform the hiding process on the other information, so that the DOI can be displayed at the top layer and is not obscured. In this way, other terminal devices can accurately scan the DOI, and thus improves the DOI reading efficiency.

In step S101 shown in FIG. 1, the terminal device may monitor the display positions of the DOI and other information on the page by using a JavaScript program. Specifically, an application in the terminal device may monitor the display positions of the DOI and other information. The application includes, but is not limited to, various programs, including the JavaScript program, that are installed in the terminal device and have a page display function, for example, a browser and a player. The JavaScript program may be embedded in the page.

During the monitoring process, specific display positions of the DOI and other information may be reflected by a series of coordinates (in other words, coordinate sets). With the JavaScript program, it can be detected in real time whether some of the coordinate sets of the display positions of the DOI and other information superimpose on each other (e.g., whether the DOI and the other information have identical coordinate sets), to determine whether the display position of the DOI overlaps the display position of the other information.

Continuing with the above example, in the two-dimensional code in FIG. 2, coordinates corresponding to two upper vertexes A1 and A2 are as shown in the figure, and coordinates of two lower vertexes A3 and A4 (not shown in FIG. 2 because they are covered by the hover picture) are (20,10) and (30,10), respectively. The coordinates of four vertexes B1 to B4 of the hover picture are shown in FIG. 2. From the coordinates of the vertexes, it can be seen that the hover picture overlaps the two-dimensional code.

In the present application, the coordinate sets of the DOI and other information may be determined by many mechanisms, for example, acquiring corresponding coordinate information by reading an HTML (HyperText Mark-up Language) source file of the page, or acquiring coordinate information of a target area after identifying images in content in the display window. The present application is not limited to any specific mechanism. The DOI and the other information, when displayed, may have irregular shapes. By comparing the coordinates (e.g., of the pixels), the terminal device can determine which portion of the DOI and the other information overlap.

As discussed above, the JavaScript program may be used to adjust various dynamic functions (including a display manner, a display state, and the like of the information displayed on the page) on the page. In some embodiments of the present application, the JavaScript program may further be used to perform the hiding process on the other information. In other words, in some embodiments of the present application, the JavaScript program not only can monitor the display positions of the DOI and other information, but also can perform the hiding process on the other information.

In some embodiments, the hiding process on the other information may include hiding, at least a portion of the other information by, e.g., adjusting the transparency of the portion of the other information, to expose the DOI. In one exemplary embodiment of the present application, an application in the terminal device may acquire an Alpha Channel corresponding to the other information by reading an HTML source file of the page with the JavaScript program, and adjust a gray value in the Alpha Channel, to maximize the transparency of the other information. In some embodiments, by adjusting the gray value, the terminal device can make the other information become completely transparent.

Figure 3:
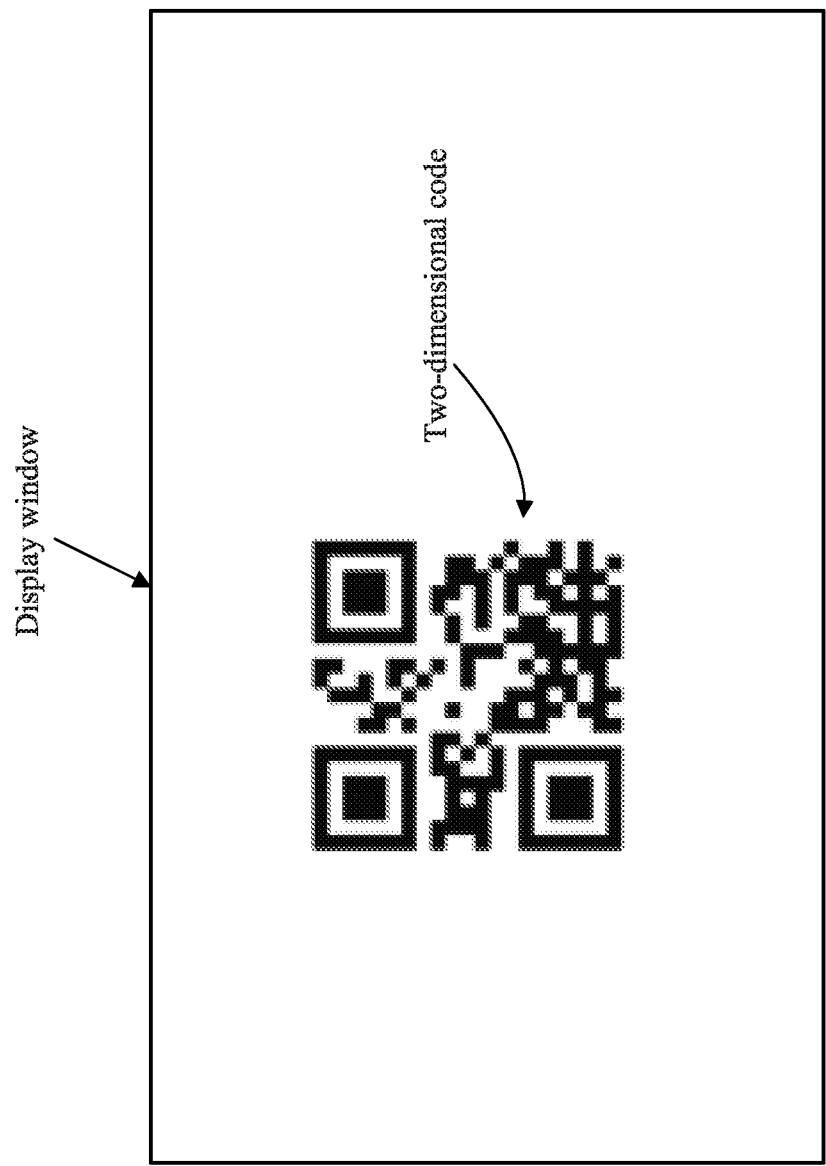
FIG. 3 shows a schematic diagram in which a hover picture is hidden according to an embodiment of the present application.

For example, continuing with the above example, because the hover picture obscures the two-dimensional code on the page shown in FIG. 2, the application in the terminal device may acquire an Alpha Channel corresponding to the hover picture, and adjust a gray value in the Alpha Channel, to make the hover picture completely transparent, as shown in FIG. 3. After the adjustment, the two-dimensional code is clearly displayed on the page.

In another exemplary embodiment of the present application, the hiding process on the other information may include determining an overlap area between the display position of the other information and the display position of the DOI, and adjusting the transparency of the overlapping area in the display position of the other information. In other words, in this embodiment, the other information is not hidden completely; instead, only the area overlapping the DOI is hidden. The overlapping area may also be determined according to the coordinate sets, and specifically, the overlapping area is an area corresponding to the superimposition between a coordinate set of a display area of the DOI and a coordinate set of a display area of the other information.

Figure 4:
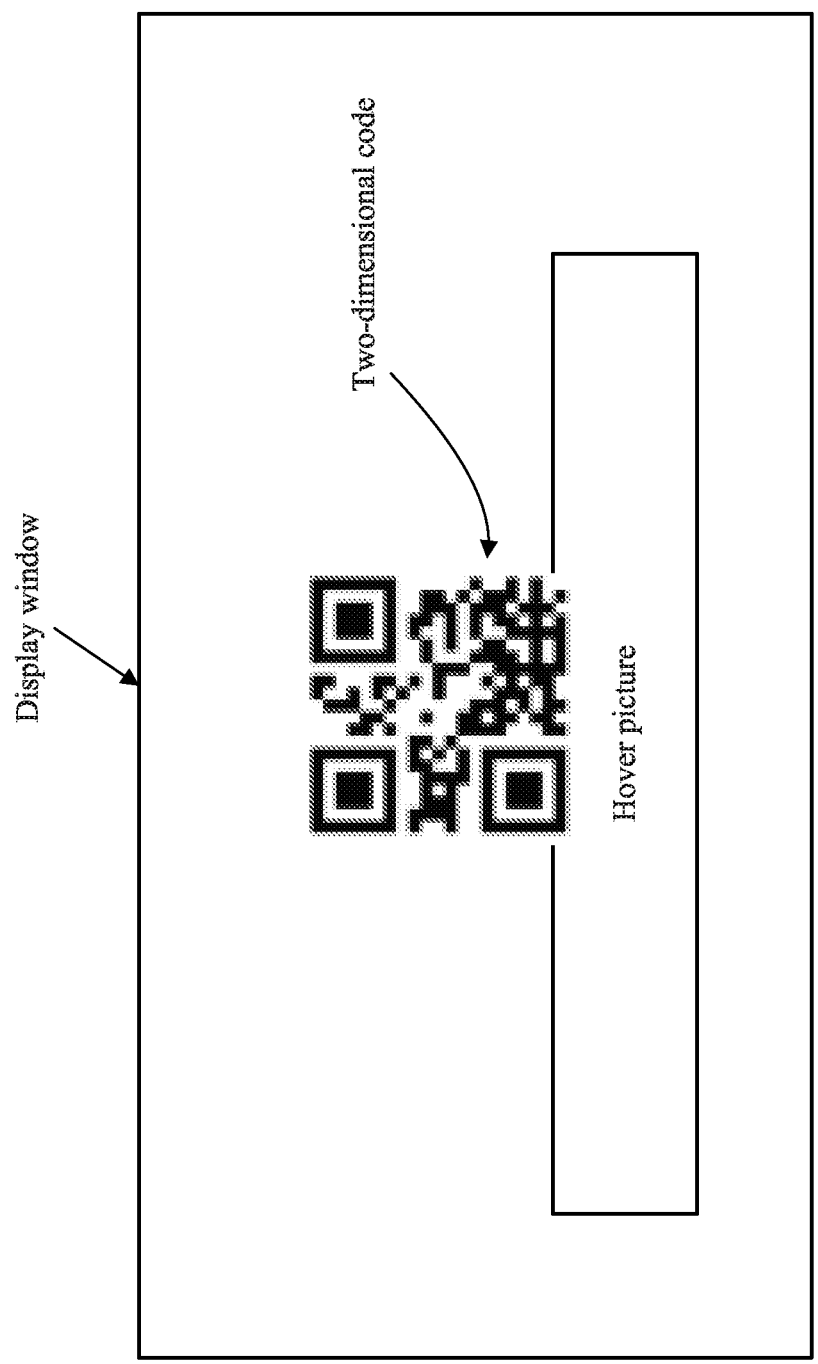
FIG. 4 shows a schematic diagram of hiding an overlapping area between a hover picture and a two-dimensional code according to an embodiment of the present application.

For example, in FIG. 2, an overlap area between the hover picture and the two-dimensional code is determined according to the coordinates of the two-dimensional code and the hover picture, and then, the hover picture in the overlapping area may be hidden by adjusting the transparency of the overlapping area in the hover picture, as shown in FIG. 4.

In some other embodiments, the terminal device may display the DOI on top of the other information, so that the other information does not obscure the DOI.

Through the foregoing steps, during scan of the DOI, the JavaScript program is used to monitor the display position of the DOI on the page, and if it is detected that the other information on the page obscures the DOI, at least a part of the other information is hidden, so that the DOI is displayed clearly, thereby effectively improving the DOI reading efficiency, and avoiding the problem that the DOI cannot be read because the other information on the page obscures the DOI.

Figure 5:
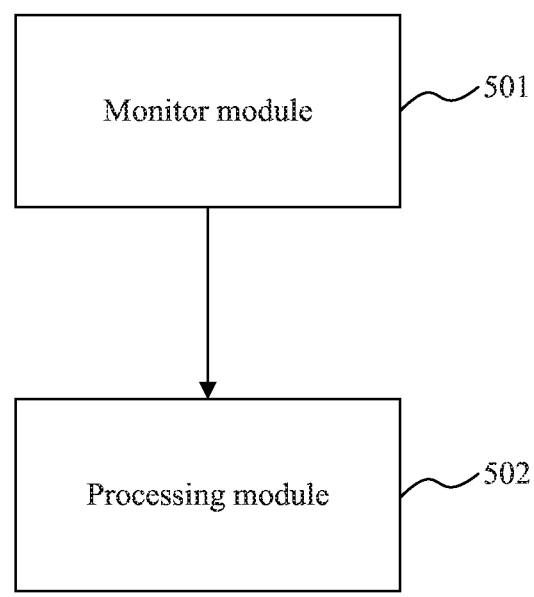
FIG. 5 shows a schematic block diagram of an apparatus for displaying information according to an embodiment of the present application.

The present disclosure further provides an apparatus for displaying information, as shown in FIG. 5. As shown in FIG. 5, a terminal device for displaying information may include a monitor module 501 and a processing module 502.

The monitor module 501 is configured to monitor a display position of a DOI and a display position of other information on a page (e.g., a webpage). The DOI includes, but is not limited to: graphic identifiers such as a barcode or a two-dimensional code. The other information includes, but is not limited to, at least one of a cursor, a popup window, or a floating window. In some embodiments, the monitor module 501 includes a JavaScript program configured to monitor the display position of the DOI and the display position of other information on the page.

The processing module 502 is configured to perform a hiding process on the other information when it is detected that the display position of the other information overlaps the display position of the DOI. In some embodiments, the processing module 502 includes or is configured to execute a JavaScript program configured to perform the hiding process on the other information. In some embodiments, the processing module 502 is configured to hide the other information by adjusting the transparency of the other information. In some other embodiments of the present application, the processing module 502 is configured to determine an overlapping area between the display position of the other information and the display position of the DOI, and adjust the transparency of the overlapping area in the display position of the other information, so that the overlapping area in the other information does not obscure the DOI.

A person having ordinary skill in the art should understand that embodiments of the present application may be provided as method, system or computer program products. The invention may be in the form of a hardware embodiment, a software embodiment, or a combined hardware and software embodiment. Moreover, the invention may be in the form of a computer program product implemented on a non-transitory computer-readable memory medium (including, but not limited to, disk memory, CD-ROM, and optical memory) comprising computer-executable program codes.

The present application is described with reference to the flowchart and/or block diagram of the method, device (system) and computer program product according to the embodiments of the present application. It should be understood that the flow and/or block in the flowchart and/or block diagram, and the combination of a flow and/or block in the flowchart and/or block diagram can be implemented by computer program commands. Such computer program commands can be provided to a processor of a general computer, a dedicated computer, an embedded processing unit or other programmable data processing devices to produce a machine, so that the commands executed by the processor of the computer or the other programmable data processing devices produce an apparatus used for implementing functions specified in one or more flows in the flowchart and/or one or more blocks in the block diagram.

These computer program commands may also be stored in a non-transitory computer-readable memory capable of guiding a computer or other programmable data processing devices to function in a specified mode. The commands stored in the computer-readable memory generate a product with the commands for implementing the functions specified in one or more flows in the flowchart and/or one or more blocks in the block diagram.

These computer program commands may also be loaded in a computer or other programmable data processing devices. The commands when executed on the computer or other programmable data processing devices provide the steps for implementing the functions specified in one or more flows in the flowchart and/or one or more blocks in the block diagram.

According to a typical configuration, a computing device for implementing the disclosed methods and apparatus may include one or more processors (CPUs), an input/output interface, a network port, and a memory. In some exemplary embodiments, the memory may include a non-transitory computer-readable storage medium including instructions, which when executed by the computer, perform the above-described methods. In some exemplary embodiments, the computer device may be a mobile device, such as a mobile phone or a watch.

The memory may include a volatile memory, a Random Access Memory (RAM) and/or a non-volatile memory (NVM), such as a Read Only Memory (ROM) or a flash RAM. The memory is an example of computer-readable media. Specific examples of computer-readable media may include, but are not limited to, Phase Change Random Access Memory (PRAM), Static Random Access Memory (SRAM), Dynamic Random Access Memory (DRAM), and other types of RAM, Read-Only Memory (ROM), Electrically Erasable Programmable Read-Only Memory (EEPROM), flash memory, or other internal memory, Compact Disc Read-Only Memory (CD-ROM), Digital Versatile Disc (DVD) or other optical storage means, magnetic tape cassettes, magnetic tapes or magnetic discs, or other magnetic storage devices, or any other non-transmission media that can be used for storing information that can be accessed by computing devices. As defined herein, the computer-readable media do not include computer-readable transitory media, e.g., modulated data signals and signal carriers.

It should be noted that the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open-ended, in that an item or items following any one of these words is not meant to be an exhaustive listing of such item or items, or meant to be limited to only the listed item or items.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. A terminal device for displaying information thereon, comprising:
   a memory for storing instructions;
   a processor configured to execute the instructions to cause the terminal device to:
      monitor a display position of a first object and a display position of a second object displayed on the terminal device;
      detect that the display position of the second object overlaps the display position of the first object displayed on the terminal device;
      determine an overlapping area between the display position of the second object and the display position of the first object by comparing a coordinate set of vertices of the second object and a coordinate set of vertices of the first object; and
      adjust transparency of the overlapping area of the second object to expose the first object on the overlapping area while a display of a rest of the second object is unchanged.

2. The terminal device of claim 1, wherein the processor is configured to execute the instructions to further cause the terminal device to:
   use a JavaScript program to monitor the display position of the first object and the display position of the second object; and
   use the JavaScript program to adjust transparency of the overlapping area of the second object to expose the first object.

3. The terminal device of claim 1, wherein the second object comprises at least one of a cursor, a popup window, or a floating window.

4. The terminal device of claim 1, wherein the first object comprises at least one of a barcode or a two-dimensional code.

5. The terminal device of claim 1, wherein the first object comprises a Digital Object Unique Identifier.

6. The terminal device of claim 1, wherein the processor is configured to execute the instructions to cause the terminal device to detect that the display position of the second object overlaps the display position of the first object displayed on the terminal device based on a coordinate set of the display position of the second object overlaps with a coordinate set of the display position of the first object.

7. A method for displaying information on a terminal device, comprising:
   monitoring a display position of a first object and a display position of a second object displayed on the terminal device;
   detecting that the display position of the second object overlaps the display position of the first object displayed on the terminal device;
   determining an overlapping area between the display position of the second object and the display position of the first object by comparing a coordinate set of vertices of the second object and a coordinate set of vertices of the first object; and
   adjusting transparency of the overlapping area of the second object to expose the first object on the overlapping area while a display of a rest of the second object is unchanged.

8. The method of claim 7, wherein monitoring the display position of the first object comprises monitoring the display position of the first object using a JavaScript program; and
   adjusting transparency of the overlapping area of the second object to expose the first object comprises adjusting transparency of the overlapping area of the second object by using the JavaScript program.

9. The method of claim 7, wherein the second object comprises at least one of a cursor, a popup window, or a floating window.

10. The method of claim 7, wherein the first object comprises at least one of a barcode or a two-dimensional code.

11. The method of claim 7, wherein the first object comprises a Digital Object Unique Identifier.

12. The method of claim 7, wherein detecting that the display position of the second object overlaps the display position of the first object displayed on the terminal device comprises detecting that the display position of the second object overlaps the display position of the first object displayed on the terminal device based on a coordinate set of the display position of the second object overlaps with a coordinate set of the display position of the first object.

13. A non-transitory computer-readable storage medium having stored therein instructions that are executable by one or more processors of a terminal device to cause the terminal device to perform a method for displaying information on the terminal device comprising:
- monitoring a display position of a first object and a display position of a second object displayed on the terminal device;
- detecting that the display position of the second object overlaps the display position of the first object;
- determining an overlapping area between the display position of the second object and the display position of the first object by comparing a coordinate set of vertices of the second object and a coordinate set of vertices of the first object; and
- adjusting transparency of the overlapping area of the second object to expose the first object on the overlapping area while a display of a rest of the second object is unchanged.

14. The non-transitory computer readable medium of claim 13, wherein the instructions are executable by the one or more processors of the terminal device to cause the terminal device to further perform:
- monitoring the display position of the first object using a JavaScript program; and
- adjusting transparency of the overlapping area of the second object to expose the first object comprises adjusting transparency of the overlapping area of the second object by using the JavaScript program.

15. The non-transitory computer readable medium of claim 13, wherein the second object comprises at least one of a cursor, a popup window, or a floating window.

16. The non-transitory computer readable medium of claim 13, wherein the first object comprises at least one of a barcode or a two-dimensional code.

17. The non-transitory computer readable medium of claim 13, wherein detecting that the display position of the second object overlaps the display position of the first object displayed on the terminal device comprises detecting that the display position of the second object overlaps the display position of the first object displayed on the terminal device based on a coordinate set of the display position of the second object overlaps with a coordinate set of the display position of the first object.

* * * * *